Dec. 30, 1969     T. B. EDWARDS     3,487,285

CONSTANT CURRENT GENERATOR FOR CHARGING BATTERIES

Filed Sept. 28, 1967

INVENTOR,
Theodoric B. Edwards
(deceased,)
by: Helen M. Edwards, Executrix.

BY: Harry M. Saragovitz,
Edward J. Kelly &
R. P. Gibson     ATTORNEYS.

US United States Patent Office 3,487,285
Patented Dec. 30, 1969

3,487,285
CONSTANT CURRENT GENERATOR FOR CHARGING BATTERIES
Theodoric B. Edwards, deceased, late of Lorton, Va., by Helen M. Edwards, executrix, 467 Buckner Road, Manassas, Va. 22110
Filed Sept. 28, 1967, Ser. No. 671,928
Int. Cl. H02j 7/14
U.S. Cl. 320—61                          1 Claim

ABSTRACT OF THE DISCLOSURE

An automotive generator which uses permanent magnets instead of stator coils to provide a cross-field. This results in a constant stator field which is independent of battery voltage and provides a constant current output without the use of a voltage regulator.

---

The invention described herein may be manufactured and used by or for the Government of the United States of America for governmental purposes without the payment to me of any royalty thereon.

Automotive generators now in use whether the shunt DC type or the newly developed alternator-rectifier type depend for operation on an external vibrating contact voltage regulator to keep the voltage constant and another vibrating contact relay to prevent excessive current flow when running with a discharge battery. These vibrating contacts give considerable trouble due to wear, burning and sticking which usually results in generator and battery failure.

An object of the invention is an improved automotive generator system which will charge a low battery quickly and not overcharge a battery under summer driving conditions.

Another object of the invention is an improved automotive generator system which requires little maintenance and which maintains battery charge at idling engine speeds.

The invention will be more fully understood and its objects and advantages further appreciated by referring to the following detailed description taken in conjunction with the accompanying drawings in the several figures of which like numerals identify like elements and in which:

FIGURE 1 is an end view of the cross-field DC generator of the invention with the end cap removed; and FIGURE 2 is a view similar to FIGURE 1 illustrating another embodiment of the invention.

Referring now to FIGURE 1 of the drawing, reference numeral 10 indicates a cylindrical ferrous housing having formed integral therewith on the inside surface diametrically opposed permanent magnet poles 11 and 12 which produce a constant flux not dependent upon battery excitation in a direction transversely of the armature 13 longitudinal axis. To avoid bad commutation, commutation zones 14 and 14a relatively free of flux is created by dividing the poles into polar projections. Shaft 15 of the wire wound armature is mounted for free rotation in bearings fixed in the end caps or bells, not shown, of housing 10. The commutator is indicated by reference numeral 16 and the armature winding by 16a. The axis of the output brushes 17 and 18 is in line with the axis of poles 11 and 12 instead of being at right angle thereto as in ordinary two-pole generator. Brushes 19 and 20 are short circuited by means of conductor 21 which has connected in series therewith a thermal fuse or breaker 21a. Output brushes 17 and 18 are connected to battery 22 by means of conductors 33 and 34. A diode 24 is connected in series with brush 18 and one terminal of battery 22 to prevent backflow of current from battery 22 to the generator.

In operation, the rotation of armature 13 through the constant magnetic field produced by the permanent magnet poles causes a flow of current I$b$ through the short circuited armature along the axis of the short circuit brushes 19 and 20 thereby creating a powerful crossfield M$b$ as indicated by the arrow M$b$. The rotation of the armature through crossfield M$b$ generates an EMF and current along the axis of the output brushes in such a direction that the armature magnetomotive force represented by arrow M$b$ opposes the field set up by the permanent magnet poles resulting in the field flux parallel to the axis of output brushes being small, preventing excessive currents in the armature circuit formed by the short circuited brushes 19 and 20. There is a definite limit to the current which can be delivered at the output brushes 17 and 18. This occurs when MNF M$b$ neutralizes the field excitation existing between the poles 11 and 12 for if this was exceeded there would be no EMF and current in the short circuit of the armature and hence no EMF available at the output brushes. Beyond a certain speed the generator will deliver a practically constant current.

The generator of the invention resembles the well known Rosenberg generator but there is a significant difference. In the Rosenberg generator the battery voltage determines the field strength and with a fully charged battery the maximum current flow would be larger than with a discharged battery. This like the old third brush generator would overcharge the battery under summer driving conditions. However in the cross-field generator of the invention the permanent magnet stator field is constant and a rise in battery voltage as a result of charging will result in a lower maximum current flow to the battery as the charge increases. This effect is further enhanced by providing the generator of the invention with stator windings which produce a controlled field in opposition to stator field produced between poles 11 and 12 as shown in FIGURE 2 wherein the housing 10 is provided with ferrous cores 25 and 26. Cores 25 and 26 are provided with series connected windings 25a and 26a, respectively, wound in a direction so as to create a field opposing the permanent magnet stator field. Terminal 27 of the series connected winding is connected to one terminal of battery 22 by means of conductor 27a and terminal 28 thereof is connected to another terminal of battery 22 by means of conductor 28a through series connected switch 29 and the adjustable current limiting resistor 30 which is varied to provide the desired degree of said opposing field.

It is to be noted that the cross-field generator of the invention is separately excited by permanent magnet resulting in useable output at lower speeds than the shunt generator and due to the absence of the usual field winding, a larger armature diameter may be used thus allowing full generating capacity at low speeds.

Although a specific embodiment of the invention has been illustrated and described, it will be understood that this is but illustrative and that various modifications may be made therein without departing from the spirit of the invention and the scope of the appended claim.

What is claimed is:
1. An improved automotive generator system comprising in combination a generator consisting of a cylindrical ferrous housing, diametrically opposed cores formed on the inside surface of said housing and projecting radially inward thereof, permanent magnets affixed to said cores whereby a constant magnetic field transverse of the longitudinal axis of said housing is obtained, a wire wound armature including commutator means adapted for rota- tion in said housing between said permanent magnets, a first pair of commutator brushes positioned transversely of said constant magnetic field, short circuit means connecting said first pair of brushes, thermal fuze means in series with said short circuit means and said first pair brushes, a second pair of commutator brushes comprising output brushes in alignment with said constant magnetic field, a battery to be charged by said generator, one terminal of said battery connected to one of said output brushes, a diode coupling another terminal of said battery to the other of said output brushes whereby backflow of current from said battery to said generator is prevented, each said cores provided with a winding poled to produce an electromagnetic field in opposition to said constant magnetic field, said winding having one terminal thereof connected to a terminal of said battery and another terminal thereof connected to another terminal of said battery through variable resistor means whereby variable electromagnetic field is applied in opposition to said constant magnetic field producing controlled variations in said constant field.

References Cited

UNITED STATES PATENTS

| | | | |
|---|---|---|---|
| 835,363 | 11/1906 | Milch | 310—151 X |
| 1,084,365 | 1/1914 | Rosenberg | 310—151 |
| 2,193,406 | 3/1940 | Goss et al. | 310—154 |
| 2,625,674 | 1/1953 | Petit | 322—52 X |
| 3,271,601 | 9/1966 | Raver | 310—181 X |
| 3,396,325 | 8/1968 | Hopkins | 322—46 |
| 3,411,027 | 11/1968 | Rosenberg | 310—181 |

OTHER REFERENCES

Fitzgerald and Kingsley: Electrical and Electronic Engineering Series, Electric Machinery, 1952, McGraw-Hill, pp. 504–507 relied upon.

LEE T. HIX, Primary Examiner

STANLEY WEINBERG, Assistant Examiner

U.S. Cl. X.R.

310—151, 181; 322—52